(12) United States Patent
Merritt et al.

(10) Patent No.: US 11,486,978 B2
(45) Date of Patent: Nov. 1, 2022

(54) TECHNOLOGY TO SUPPORT THE COEXISTENCE OF MULTIPLE INDEPENDENT LIDAR SENSORS

(71) Applicant: Intel Corporation, Santa Clara, CA (US)

(72) Inventors: Alexander Marshall Merritt, Hillsboro, OR (US); David I. Gonzalez Aguirre, Hillsboro, OR (US); Kathiravetpillai Sivanesan, Portland, OR (US); Ignacio Alvarez, Portland, OR (US); Sridhar Sharma, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 16/232,213

(22) Filed: Dec. 26, 2018

(65) Prior Publication Data

US 2019/0129014 A1    May 2, 2019

(51) Int. Cl.
  *G01S 7/4863*    (2020.01)
  *G01S 7/48*    (2006.01)
  (Continued)

(52) U.S. Cl.
  CPC .......... *G01S 7/4863* (2013.01); *G01S 7/003* (2013.01); *G01S 7/021* (2013.01); *G01S 7/4802* (2013.01);
  (Continued)

(58) Field of Classification Search
  CPC ........ G01S 7/495; G01S 7/4804; G01S 17/10; G01S 17/26; G01S 17/32; G01S 17/36;
  (Continued)

(56) References Cited

U.S. PATENT DOCUMENTS

| 2012/0038903 A1 | 2/2012 | Weimer et al. |
| 2017/0273161 A1 | 9/2017 | Nakamura |

(Continued)

FOREIGN PATENT DOCUMENTS

| DE | 102016011299 A1 | 3/2018 |
| JP | 2018511785 A | 4/2018 |

(Continued)

OTHER PUBLICATIONS

International Search Report and Written Opinion for International Patent Application No. PCT/US2019/063303, dated Mar. 20, 2020, 10 pages.

(Continued)

*Primary Examiner* — Yuqing Xiao
*Assistant Examiner* — Amir J Askarian
(74) *Attorney, Agent, or Firm* — Jordan IP Law, LLC (57) ABSTRACT

Systems, apparatuses and methods may provide for technology that initiates one or more optical pulses in accordance with a first emission pattern, obtains a second emission pattern in response to one or more of a time-variable trigger or a deviation of one or more received optical reflections from an expected reflection pattern, and initiates one or more optical pulses in accordance with the second emission pattern. Moreover, infrastructure node technology may detect, based on an interference notification from a first sensor platform, a deviation of received optical reflection(s) from an expected reflection pattern, select emission parameter(s) in response to the deviation, and alter a first emission pattern with respect to the selected emission parameter(s) to obtain a second emission pattern.

24 Claims, 8 Drawing Sheets

(51) Int. Cl.
*G01S 7/484* (2006.01)
*G01S 7/02* (2006.01)
*G01S 17/10* (2020.01)
*G01S 7/00* (2006.01)
*G01S 17/04* (2020.01)
*G01S 17/931* (2020.01)

(52) U.S. Cl.
CPC .............. *G01S 7/484* (2013.01); *G01S 17/04* (2020.01); *G01S 17/10* (2013.01); *G01S 17/931* (2020.01)

(58) Field of Classification Search
CPC ........ G01S 7/487; G01S 7/4863; G01S 7/003; G01S 7/021; G01S 7/4802; G01S 7/484; G01S 17/04; G01S 17/931; G01S 7/4815; G01S 7/4817; G01S 17/42; G01S 17/86; G01S 17/89; G01S 17/894; G01S 7/4868; G02B 26/105
See application file for complete search history.

(56) References Cited

U.S. PATENT DOCUMENTS

2018/0238998 A1 8/2018 Dussan
2019/0178991 A1* 6/2019 Hall ..................... G01S 17/10
2019/0353787 A1* 11/2019 Petit ..................... G01S 7/484

FOREIGN PATENT DOCUMENTS

| KR | 1020140145481 A | 12/2014 |
| KR | 1020150052469 A | 5/2015 |
| WO | 2016032780 A1 | 3/2016 |

OTHER PUBLICATIONS

International Preliminary Report on Patentability for International Patent Application No. PCT/US2019/063303, dated Jun. 16, 2021, 6 pages.
"Velodyne LiDAR PUCK", Velodyne Acoustics, Inc., 2015, 2 pages.
"costmap_2d", ROS Wiki, <wiki.ros.org/costmap_2d>, retrieved on Dec. 10, 2018, 10 pages.
M. Maurer et al., "Autonomous Driving: Technical, Legal and Social Aspects", 2016, Springer-Verlag Berlin Heidelberg, 698 pages.
Extended European Search Report for EPO Application No. 19905690.4, dated Aug. 10, 2022, 8 pages.

* cited by examiner

TECHNOLOGY TO SUPPORT THE COEXISTENCE OF MULTIPLE INDEPENDENT LIDAR SENSORS

TECHNICAL FIELD

Embodiments generally relate to sensors. More particularly, embodiments relate to technology to support the coexistence of multiple independent lidar (light detection and ranging) sensors in the same physical environment.

BACKGROUND

Autonomous vehicles may use lidar sensors to detect nearby objects (e.g., pedestrians, other vehicles, etc.). For example, the lidar sensor might emit a light beam in a 360° field of view (FOV) and analyze reflections of the emitted light beam in terms of flight time to generate a point cloud that represents the surrounding environment. While such a sensing approach may be advantageous in certain circumstances, there remains considerable room for improvement. For example, if another autonomous vehicle is in the area, an emitted light beam from the lidar sensor of the other autonomous vehicle may be mistaken for a reflection of the light beam emitted by the autonomous vehicle in question. Moreover, nearby attackers might attempt to create hazardous situations by spoofing reflections of the light beam emitted from the autonomous vehicle in question.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
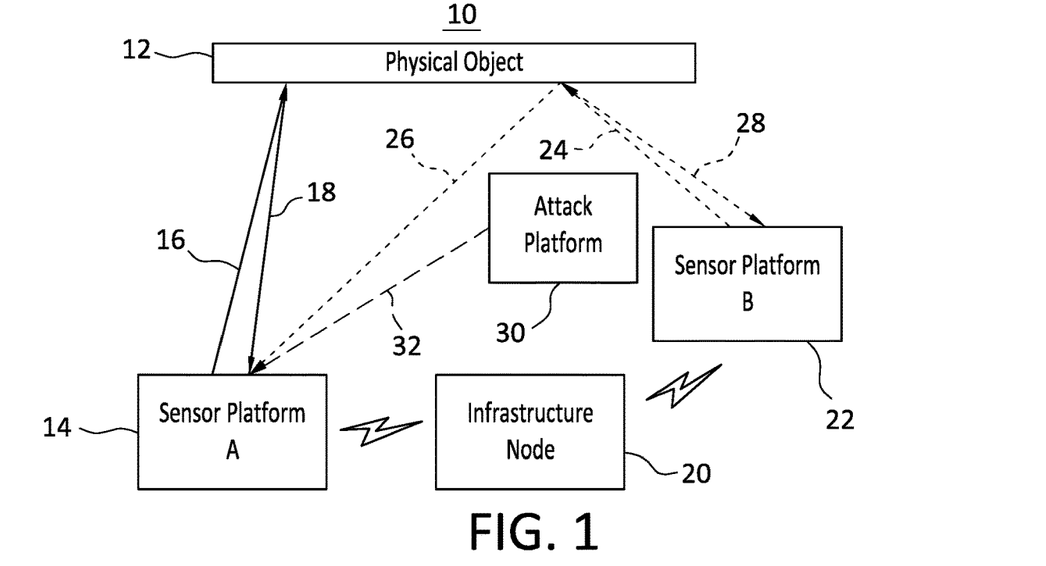
FIG. 1 is a block diagram of an example of an environment containing multiple independent sensors according to an embodiment.

Turning now to FIG. 1, an environment 10 including a physical object 12 and a first sensor platform 14 ("Sensor Platform A") is shown. The first sensor platform 14 is generally a mobile platform such as, for example, an autonomous vehicle, robot, drone, etc., wherein the location, speed, shape, direction, etc., of the physical object 12 is relevant to the navigation/movement of the first sensor platform 14. Thus, the physical object 12 might be a wall (e.g., highway barrier), a pedestrian, foliage, the ground, and so forth. The physical object 12 may also be another vehicle, robot, drone, etc. (e.g., autonomous or manually operated). In one example, the first sensor platform 14 includes a detection and ranging sensor such as, for example, a light detection and ranging (lidar) sensor. Other detection and ranging sensors such as, for example, radio detection and ranging (radar) sensors may also be used. In the illustrated example, the first sensor platform 14 emits a first optical pulse 16 (e.g., a focused outbound light beam rotated in a 360° FOV) in accordance with a first emission pattern.

The first emission pattern may be defined in terms of one or more emission parameters (e.g., n parameters) such as, for example, pulse duration, optical frequency (e.g., wavelength), pulse amplitude, pulse sequence, pulse source (e.g., single source, multiple sources), transmission angle, nutation geometry, noise profile, etc., or any combination thereof. As will be discussed in greater detail, the first emission pattern may also be altered in response to detected interferences, a time-variable (e.g., random, pseudorandom) trigger, and so forth, to obtain a different (e.g., second) emission pattern. An optical reflection 18 (e.g., inbound light) from the physical object 12 is received at the first sensor platform 14, wherein the optical reflection 18 has an expected reflection pattern (e.g., frequency, amplitude, reflection angle, noise profile, timing, etc.) corresponding to the first emission pattern.

For example, modulating the first optical pulse 16 with a particular pulse duration, sequence and/or source configuration may result in the optical reflection 18 having a certain timing that can define the expected reflection pattern. Additionally, modulating the illustrated first optical pulse 16 with a particular frequency and/or noise profile results in the optical reflection 18 having a certain frequency or range/spectrum of frequencies (e.g., noise profile) that may define the expected reflection pattern. Moreover, transmitting the first optical pulse 16 at a particular angle and/or nutation geometry (e.g., by periodically varying the inclination axis of a rotating mirror) may result in the optical reflection 18 having a certain reflection angle that defines the expected reflection pattern.

In the illustrated example, a second sensor platform 22 ("Sensor Platform B", e.g., installed in a nearby autonomous vehicle/AV) in the environment 10 emits a second optical pulse 24 in accordance with an emission pattern that is different (as indicated by the short dashed line) from the first emission pattern of the first optical pulse 16 from the first sensor platform 14. The difference between the second optical pulse 24 and the first optical pulse 16 may be in terms of, for example, pulse duration, optical frequency, pulse amplitude, pulse sequence, pulse source, transmission angle, nutation geometry, noise profile, etc. The illustrated second optical pulse 24 results in an optical reflection 26 from the physical object 12, wherein the optical reflection 26 is also received at the first sensor platform 14.

In an embodiment, the optical reflection 26 will have a reflection pattern that is different from the expected reflection pattern (e.g., in terms of frequency, amplitude, reflection angle, noise profile and/or timing) due to the difference in emission patterns between the second optical pulse 24 and the first optical pulse 16. Accordingly, the illustrated first sensor platform 14 is able to automatically disregard the optical reflection 26 even though the sensor platforms 14, 22 may be independent from one another (e.g., vehicles, robots and/or drones that are initially unaware of, or do not communicate directly with, one another). By contrast, the first sensor platform 14 uses the optical reflection 18 to determine (e.g., via time-of-flight analysis) the location, speed, shape, direction or other characteristic of the physical object 12. In one example, the first sensor platform 14 also generates a three-dimensional (3D) or two-dimensional (2D) point cloud based on the analysis. The second sensor platform 22 may receive an optical reflection 28 that is in accordance with the expectations of the second sensor platform 22.

As already noted, the first sensor platform 14 may also alter the first emission pattern in response to detected interference. For example, the first sensor platform 14 might determine that the optical reflection 18 and the optical reflection 26 are similar in terms of optical frequency. Thus, the optical reflection 26 may be considered to interfere with (or potentially interfere with) the first optical reflection 18. In such a case, the first sensor platform 14 may automatically obtain a second emission pattern that modifies, for example, the transmission angle of a subsequent optical pulse. As a result, the expected reflection angle of a subsequent optical reflection would change to an extent that enables the first sensor platform 14 to better distinguish between optical reflections (i.e., on the basis of reflection angle). In another example, the illustrated first sensor platform 14 responds to detected interference by automatically obtaining a second emission pattern that modifies the noise profile of a subsequent optical pulse. As a result, the expected noise profile of a subsequent optical reflection would change to an extent that enables the first sensor platform 14 to more accurately distinguish between optical reflections (i.e., on the basis of noise profile). The illustrated solution therefore reduces the likelihood of the first sensor platform 14 misunderstanding the location, speed, shape, direction and/or other characteristic of the physical object 12.

Additionally, the first sensor platform 14 might alter the first emission pattern in response to a time-variable trigger. For example, random or pseudorandom modifications to the first emission pattern (e.g., in terms of one or more of the n parameters) may render the first sensor platform 14 less susceptible to confusion or attack due to a relatively low likelihood of another platform selecting the same set of emission parameters and configuring them in the same manner as the first sensor platform 14.

The illustrated environment 10 also includes an attack platform 30 that attempts to "spoof" (e.g., impersonate) the optical reflection 18 with an optical pulse 32. If successful, such an attempt might mislead the first sensor platform 14 into determining that the physical object 12 is closer, farther away, oriented differently, moving at a different speed, etc., than it actually is (e.g., potentially causing an unintended collision). In the illustrated example, however, the optical pulse 32 has an emission pattern that is different (as indicated by the long dashed line) from the expected reflection pattern. More particularly, the illustrated attack platform 30 is unable to determine and emulate the emission pattern used by the first sensor platform 14. Accordingly, the first sensor platform 14 may automatically disregard the optical pulse 32 and/or report the optical pulse 32 as a malicious transmission. The illustrated solution therefore enhances the performance of the first sensor platform 14 by increasing reliability and security (e.g., reducing susceptibility to attack).

In an embodiment, the first emission pattern is obtained by selecting the first emission pattern locally on the first sensor platform 14. Alternatively, the first emission pattern is obtained from an infrastructure node 20 (e.g., roadside unit, edge node, base station, server) that tracks the presence of other platforms such as, for example, the second sensor platform 22 and/or the attack platform 30. In such a case, the first sensor platform 14 might inform the infrastructure node 20 of the emission parameter capabilities of the first sensor platform 14 (e.g., via a registration notification) and the second sensor platform 22 may inform the infrastructure node 20 of the emission parameter capabilities of the second sensor platform 22 (e.g., via a registration notification), wherein the infrastructure node 20 selects non-interfering emission patterns for the first and second sensor platforms 14, 22, respectively.

Figure 2A:
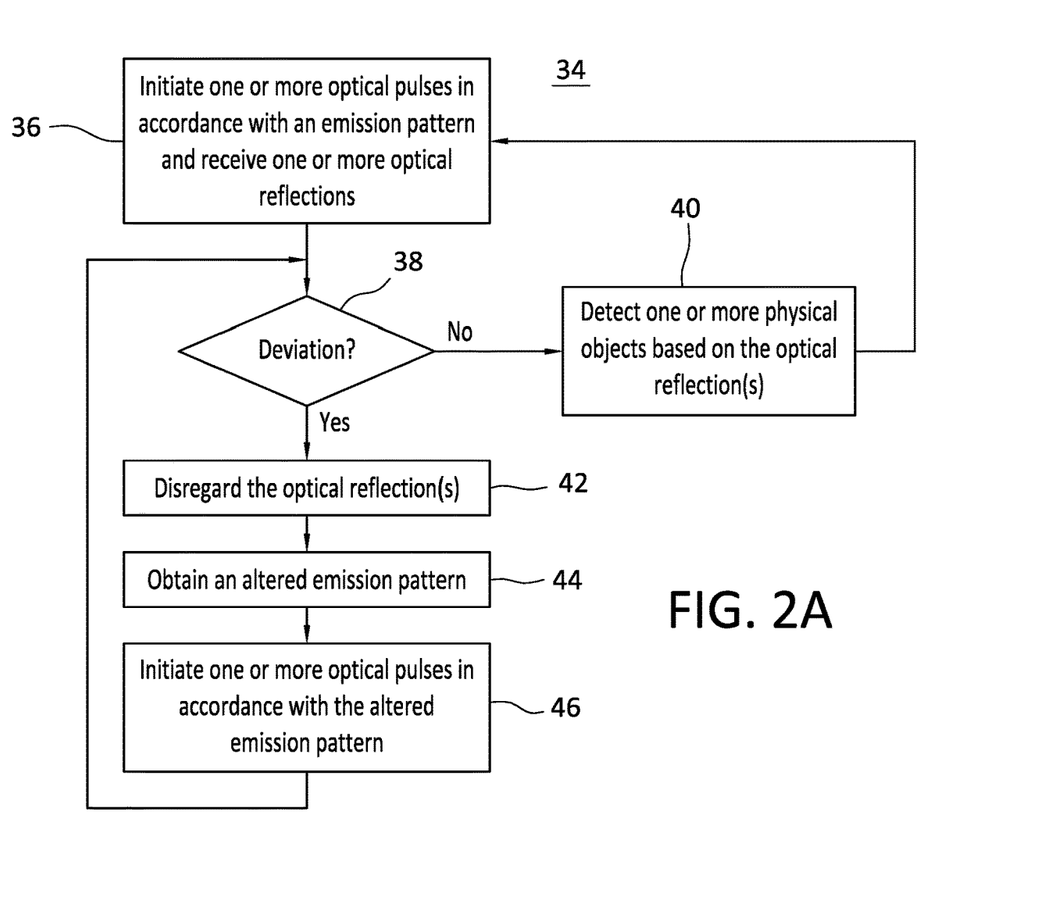
FIGS. 2A and 2B are flowcharts of examples of methods of operating a sensor according to an embodiment.

FIG. 2A shows a method 34 of operating a sensor. The method 34 may generally be implemented in a sensor platform such as, for example, the first sensor platform 14 (FIG. 1), already discussed. More particularly, the method 34 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 34 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 36 initiates one or more optical pulses in accordance with an emission pattern and receives one or more optical reflections. In one example, block 36 includes controlling one or more light sources such as, for example, one or more lasers and one or more rotating mirrors to initiate and emit the optical pulse(s) (e.g., via beam steering). Additionally, block 36 may include monitoring an optical receptor (e.g., including an array of photodiodes) to detect the optical reflection(s). In one example, block 36 includes sending (e.g., wirelessly) the active/current emission pattern to an infrastructure node, which adds the active emission pattern to a set of stored emission patterns. Block 36 may also include sending (e.g., wirelessly) a set of emission capabilities (e.g., via a registration notification specifying available frequencies, sources, transmission angles, nutation geometries, etc.) to the infrastructure node.

Block 38 determines whether a deviation exists between the optical reflection(s) and an expected reflection pattern. The expected reflection pattern may be specified based on the emission pattern in terms of frequency, amplitude, reflection angle, noise profile, timing, etc., or any combination thereof. In one example, block 38 includes determination whether any such deviation exceeds a predetermined threshold (e.g., reflection angle of 30°+/−5%). If no substantial deviation is detected, illustrated block 40 detects one or more physical objects based on the optical reflection(s) and the method returns to block 36. In an embodiment, block 40 includes determining the location, speed, shape and/or direction of the physical object(s), as well as generating a point cloud to document the surrounding environment.

If a deviation is detected at block 38, block 42 may disregard the optical reflection(s), wherein an altered emission pattern is obtained at block 44. In one example, block 44 includes selecting one or more emission parameters (e.g., pulse duration, optical frequency, pulse amplitude, pulse sequence, pulse source, transmission angle, nutation geometry, noise profile, etc., or any combination thereof) and altering the emission pattern with respect to the selected emission parameter(s). In another example, block 44 includes sending a notification (e.g., interference notification) of the deviation to an infrastructure node such as, for example, the infrastructure node 20 (FIG. 1) and receiving the altered emission pattern from the infrastructure node. Illustrated block 46 initiates one or more optical pulses in accordance with the altered emission pattern. In one example, block 46 includes sending (e.g., wirelessly) the active emission pattern to an infrastructure node, which adds the active emission pattern to a set of stored emission patterns. The method 34 then returns to block 38. The illustrated method 34 therefore enhances performance by increasing reliability and security (e.g., reducing susceptibility to attack).

Figure 2B:
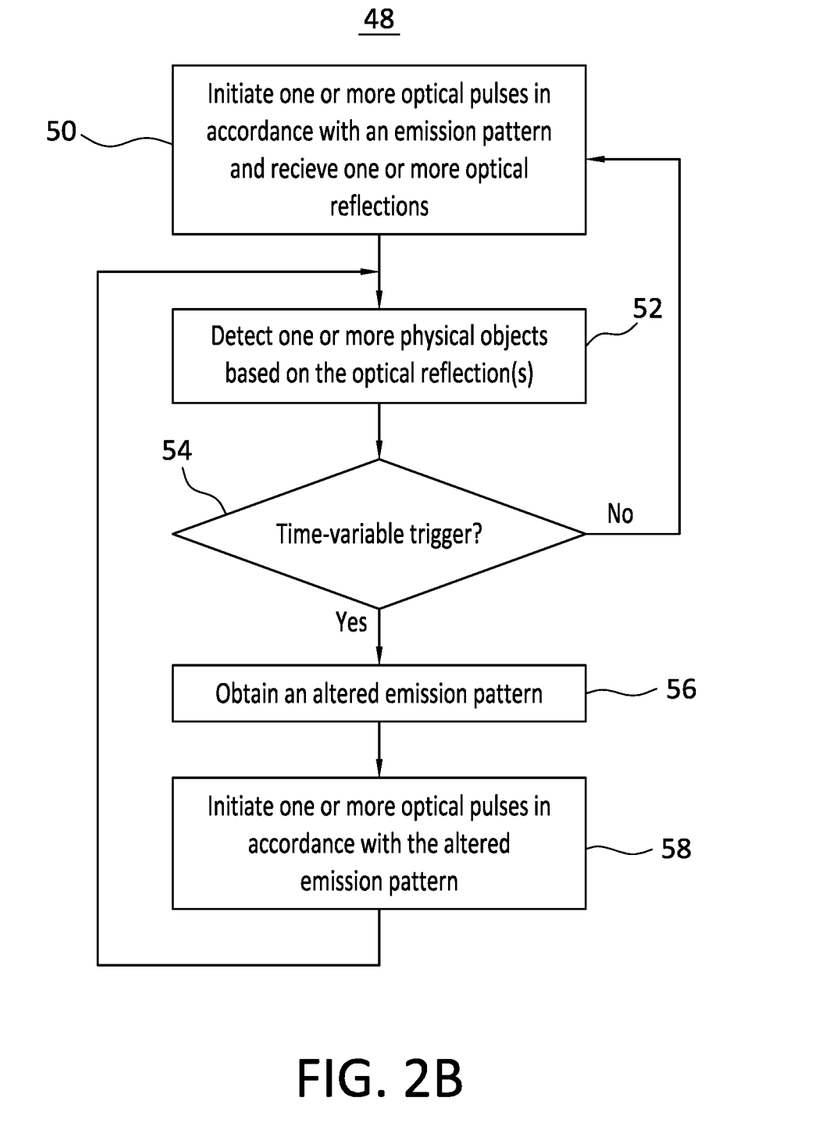

FIG. 2B shows another method 48 of operating a sensor. The method 48 may generally be implemented in a sensor platform such as, for example, the first sensor platform 14 (FIG. 1), already discussed. In an embodiment, the method 48 and the method 34 (FIG. 1) are implemented together on the same platform. More particularly, the method 48 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 50 initiates one or more optical pulses in accordance with an emission pattern and receives one or more optical reflections. In one example, block 50 includes controlling one or more light sources such as, for example, one or more lasers and one or more rotating mirrors to initiate and emit the optical pulse(s) (e.g., via beam steering). Additionally, block 50 may include monitoring an optical receptor (e.g., including an array of photodiodes) to detect the optical reflection(s). In one example, block 50 includes sending (e.g., wirelessly) the active emission pattern to an infrastructure node, which adds the active emission pattern to a set of stored emission patterns. Block 50 may also include sending (e.g., wirelessly) a set of emission capabilities (e.g., via a registration notification specifying available frequencies, sources, transmission angles, nutation geometries, etc.) to the infrastructure node. One or more physical objects are detected at block 52 based on the optical reflection(s). In an embodiment, block 52 includes determining the location, speed, shape and/or direction of the physical object(s), as well as generating a point cloud to document the surrounding environment.

A determination may be made at block 54 as to whether a time-variable trigger is present. The time-variable trigger may be generated by, for example, a random number generator (e.g., hardware-based), a pseudorandom number generator (e.g., with hidden state values), or other non-deterministic output that is difficult to predict. If the time-variable trigger is not present, the illustrated method 48 returns to block 50.

If it is determined at block 54 that the time-variable trigger is present, illustrated block 56 obtains an altered emission pattern. In one example, block 56 includes selecting one or more emission parameters (e.g., pulse duration, optical frequency, pulse amplitude, pulse sequence, pulse source, transmission angle, nutation geometry, noise profile, etc., or any combination thereof) and altering the emission pattern with respect to the selected emission parameter(s). In another example, block 56 includes sending a notification (e.g., interference notification) of the deviation to an infrastructure node such as, for example, the infrastructure node 20 (FIG. 1) and receiving the altered emission pattern from the infrastructure node. Illustrated block 58 initiates one or more optical pulses in accordance with the altered emission pattern. In one example, block 58 includes sending (e.g., wirelessly) the active emission pattern to an infrastructure node, which adds the active emission pattern to a set stored emission patterns. The method 48 then returns to block 52. The illustrated method 48 therefore enhances performance by increasing reliability and security (e.g., reducing susceptibility to attack).

Figure 3:
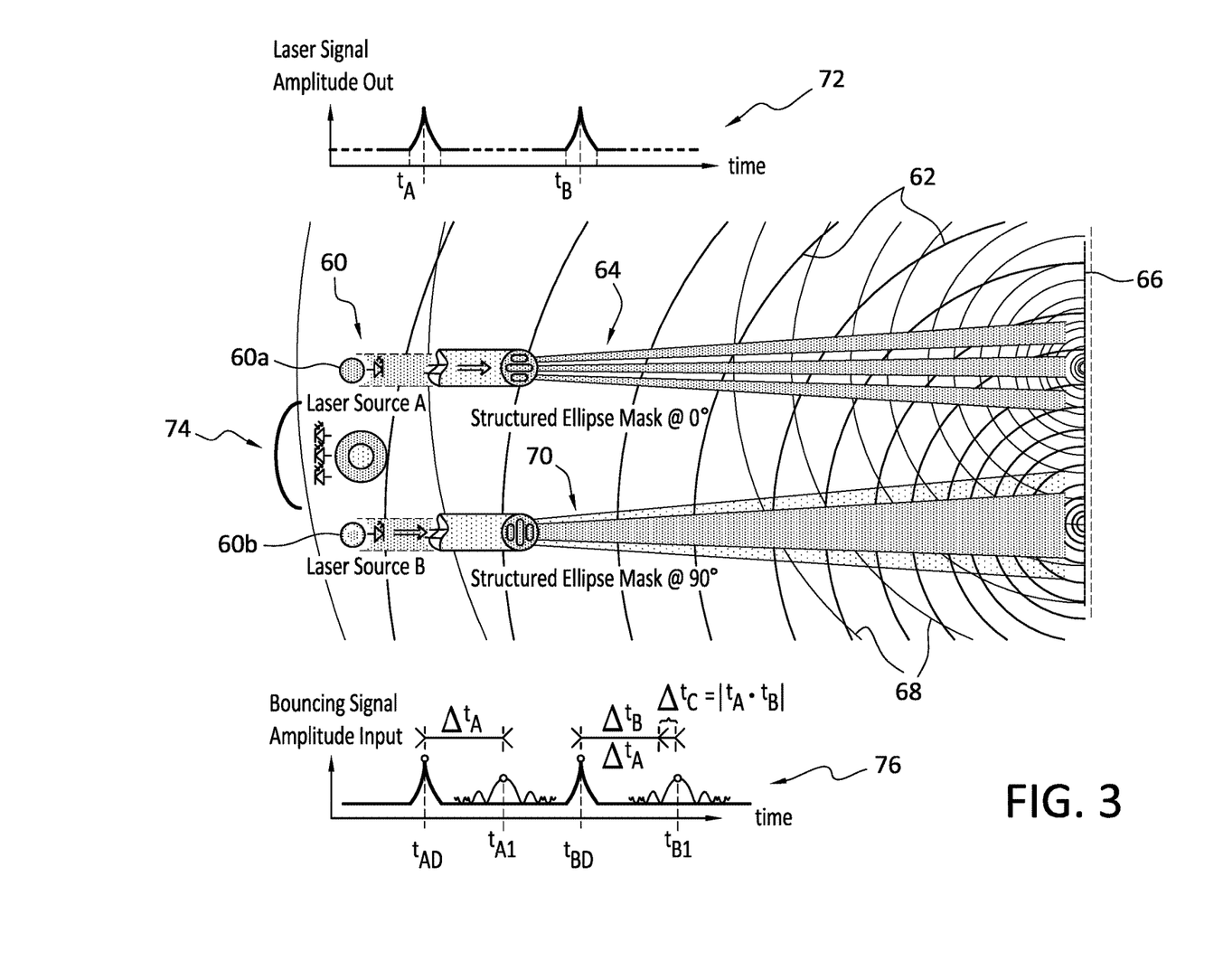
FIG. 3 is an illustration of an example of an orthogonally modulated set of light sources according to an embodiment.

FIG. 3 shows an orthogonally modulated set of time-multiplexed light sources 60 (60*a*, 60*b*). Beam steering may generally be used as a mechanism to allow windows of time when the light sources 60 can transmit without interference. In one example, the light sources 60 are synchronized in time via GPS (global positioning system) signals and a sub-timeframe is created where each light source 60 is allowed to transmit. For units where the motor can rotate/spin only in one direction, then the laser light is blocked or allowed to be transmitted. For solid state lidar systems with sophisticated MEMS (microelectromechanical system) motors that can be arbitrarily stepped, the light sources 60 transmit at different angles. In older style lidar systems, as well, the transmission angles be adjusted to be skewed with respect to each other to allow the light sources 60 to transmit at different angles.

In the illustrated example, a first light source 60*a* ("Laser Source A") is directed to a structured ellipse mask that is oriented at 0° and a second light source 60*b* ("Laser Source A") is directed to a structured ellipse mask that is oriented at 90°. In an embodiment, a first set of optical reflections 68 result from a first beam output 64 impacting a physical object 66. Similarly, a second set of optical reflections 62 result from a second beam output 70 impacting the physical object 66. The orthogonal ellipse masks enable distance and reflection measurements to be obtained in a manner that captures the surface of the physical object 66 differently. More particularly, the incidence angle and relative orientation of the surface may vary slightly due to the shape of the beam outputs 64, 70. This variance leads to subtle measurement deviations, but within a tolerance range. Accordingly, each light source 60 may act as a reference to the other. A plot 72 shows an example emission pattern in which a first pulse corresponding to the first beam output 64 is emitted at time $t_A$ and a second pulse corresponding to the second beam output 70 is emitted at time $t_B$.

The first and second sets of optical reflections 68, 62, respectively, are received by an optical receptor 74 (e.g., including a curved mirror, a set of photodiodes, etc.). A plot 76 shows an example measurement in which the first set of optical reflections 68 are received at time $t_{A1}$ and the second set of optical reflections 62 are received at time $t_{B1}$. Thus, the time-of-flight for the first beam output 64 is $\Delta t_A$ and the time-of-flight for the second beam output 70 is $\Delta t_B$, in the illustrated example. The absolute difference between $\Delta t_A$ and $\Delta t_B$ (e.g., "$\Delta t_c$") may therefore be used to detect deviations from the expected reflection pattern.

Figure 4:
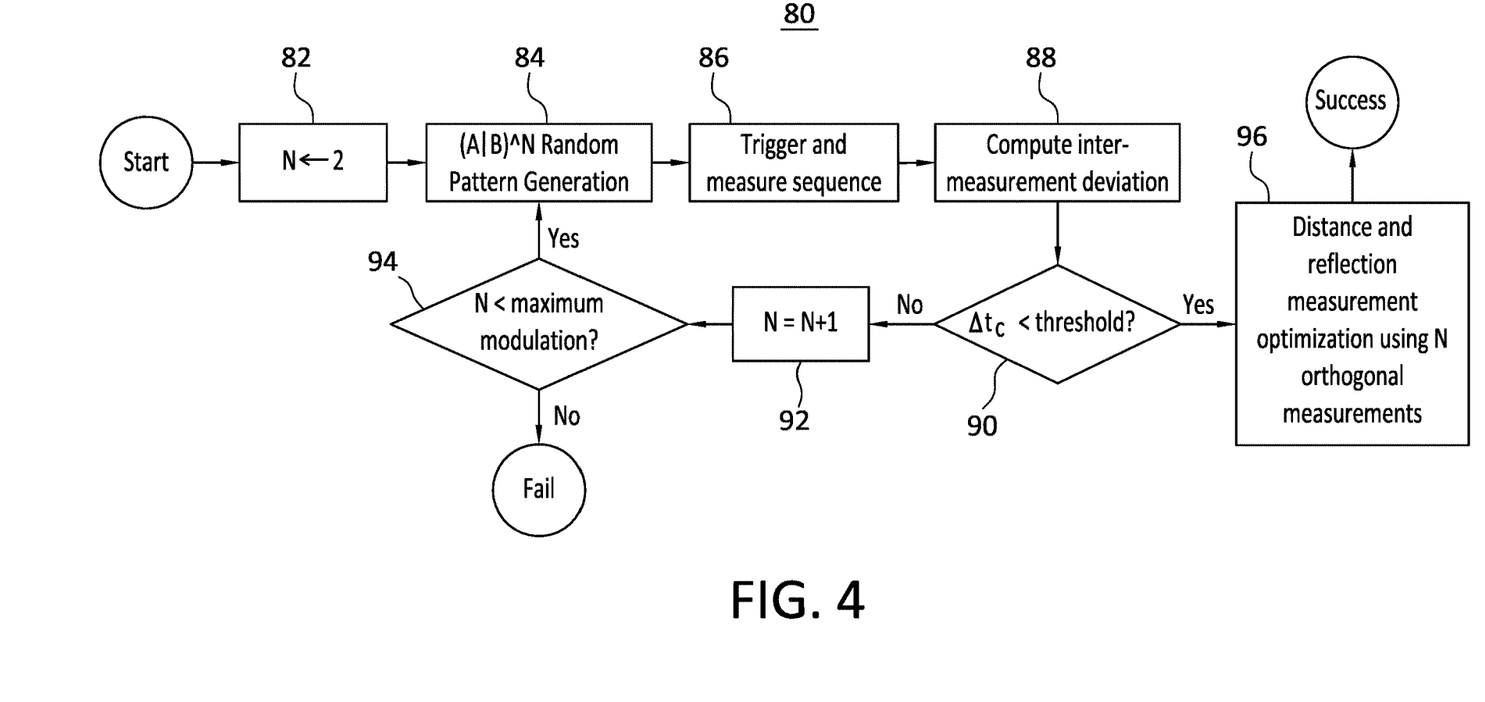
FIG. 4 is a flowchart of an example of a method of operating an orthogonally modulated set of light sources according to an embodiment.

FIG. 4 shows a method 80 of operating an orthogonally modulated set of light sources such as, for example, the light sources 60 (FIG. 3), already discussed. The method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 sets a modulation level variable "N" to the value of two, wherein a random pattern generation is conducted at block 84. In the illustrated example, the pulse sequence for a first light source "A" and a second light source "B" is defined by the expression (A|B)^N so that when N=2, the sequences AA, AB, BA, BB are randomly ordered and triggered at block 86 (e.g., where "AA" refers to triggering the first light source twice, "AB" refers to triggering the first light source followed by the second light source, and so forth). Block 86 may also determine the respective flight times (e.g., $\Delta t_A$ and $\Delta t_B$) for each pulse sequence. Illustrated block 88 computes the inter-measurement deviation (e.g., $\Delta t_c$), wherein a determination is made at block 90 as to whether the inter-measurement deviation is below a reliability threshold. If not, the reading is considered noisy and dropped. In such a case, block 92 increments the value of the modulation level variable and block 94 determines whether the modulation level exceeds a maximum modulation. The maximum modulation may be set based on the maximum time before the beam steering apparatus moves to the next location. If the modulation level is exceeded, a failure may be reported. If the modulation level does not exceed the maximum modulation, the illustrated method 80 returns to block 84. When N=3, the sequences AAA, AAB, ABA, ABB, BAA, BAB, BBA, and BBB may be randomly ordered and triggered at block 86.

If it is determined at block 90 that the inter-measurement deviation is below the reliability threshold, block 96 conducts a distance and reflection measurement optimization using N orthogonal measurements. More particularly, in block 96 the system installs the parameters from the 'trigger and measure sequence' as the active pulsation and modulation settings, as it was determined that these parameters resulted in low perturbation of measurements from other active nearby systems. For example, such parameters may include the angle of emission, (frequency or amplitude) modulation of the pulsations, timing of emissions, etc. The term "optimization" may refer to the process where multiple depth and reflection values are fused to obtain a single depth and reflection value. This fusing can be done in multiple ways to maximize the likelihood of the estimated value based on the multiple samples. It this manner, the identification of an optimal value may involve determining the maximal density value associated with the underlying probabilistic distribution function (PDF) where the samples were collected. In an embodiment, determining the maximal density includes extracting a PDF from the samples and then finding the global maxima of the function. Finding the global maxima is a numerical optimization to infer the most precise and accurate value under the limited N amount of samples. The illustrated method 80 then reports a success.

Figure 5:
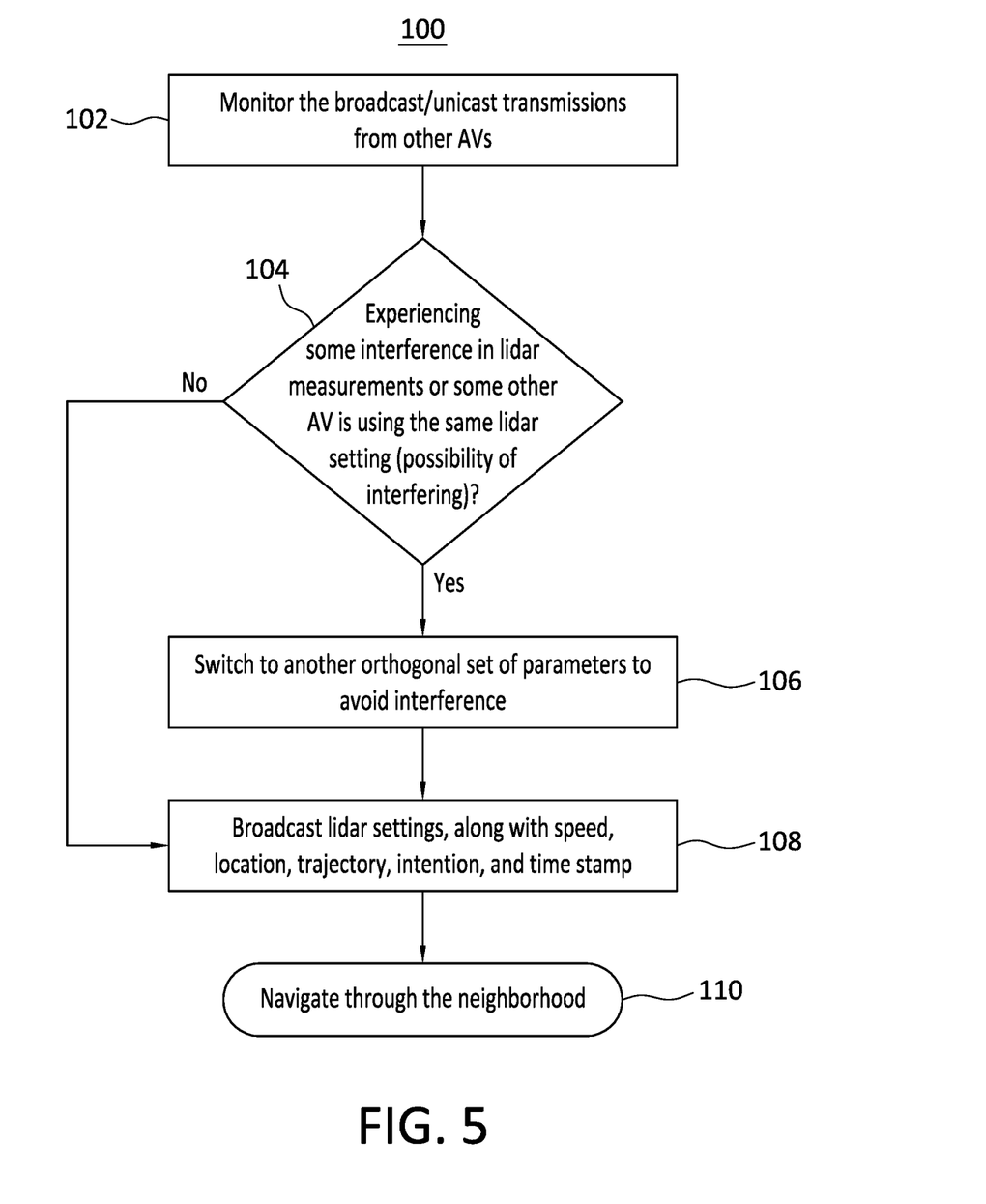
FIG. 5 is a flowchart of an example of a method of operating a sensor in an autonomous vehicle (AV) according to an embodiment.

FIG. 5 shows an ad hoc method 100 of operating a sensor in an autonomous vehicle (AV). The method 100 may generally be implemented in a sensor platform such as, for example, the first sensor platform 14 (FIG. 1), already discussed. In an embodiment, the method 100 is deployed in an environment that lacks an infrastructure node. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 monitors the broadcast/unicast transmissions from other AVs. A determination may be made at block 104 as to whether interference is being experienced or another AV is using the same lidar settings (e.g., giving rise to the possibility of interference). If so, the AV switches to another orthogonal set of parameters at block 106 to avoid interference. Illustrated block 108 broadcasts the current lidar settings, along with speed, location, trajectory, intention, and time stamp data. The AV continues to navigate through the environment (e.g., neighborhood) at block 110. If it is determined at block 104 that there is no actual or potential interference, the illustrated method bypasses block 106 and proceeds directly to block 108.

Thus, in the illustrated method 100 there is no centralized authority coordinating the lidar systems. Instead, each lidar system randomly picks its parameters and the randomness reduces the probability of conflicts, as the AV is in a dynamic environment where lidar systems join and leave the space. In one example embodiment, the AV conducts a periodic "carrier sense" to check for conflict/interference and periodically broadcasts its lidar system parameters via unicast or broadcast packets. If a conflict is detected either from the carrier sense or from other AV broadcasts, then a new set of parameters is selected.

Figure 6:
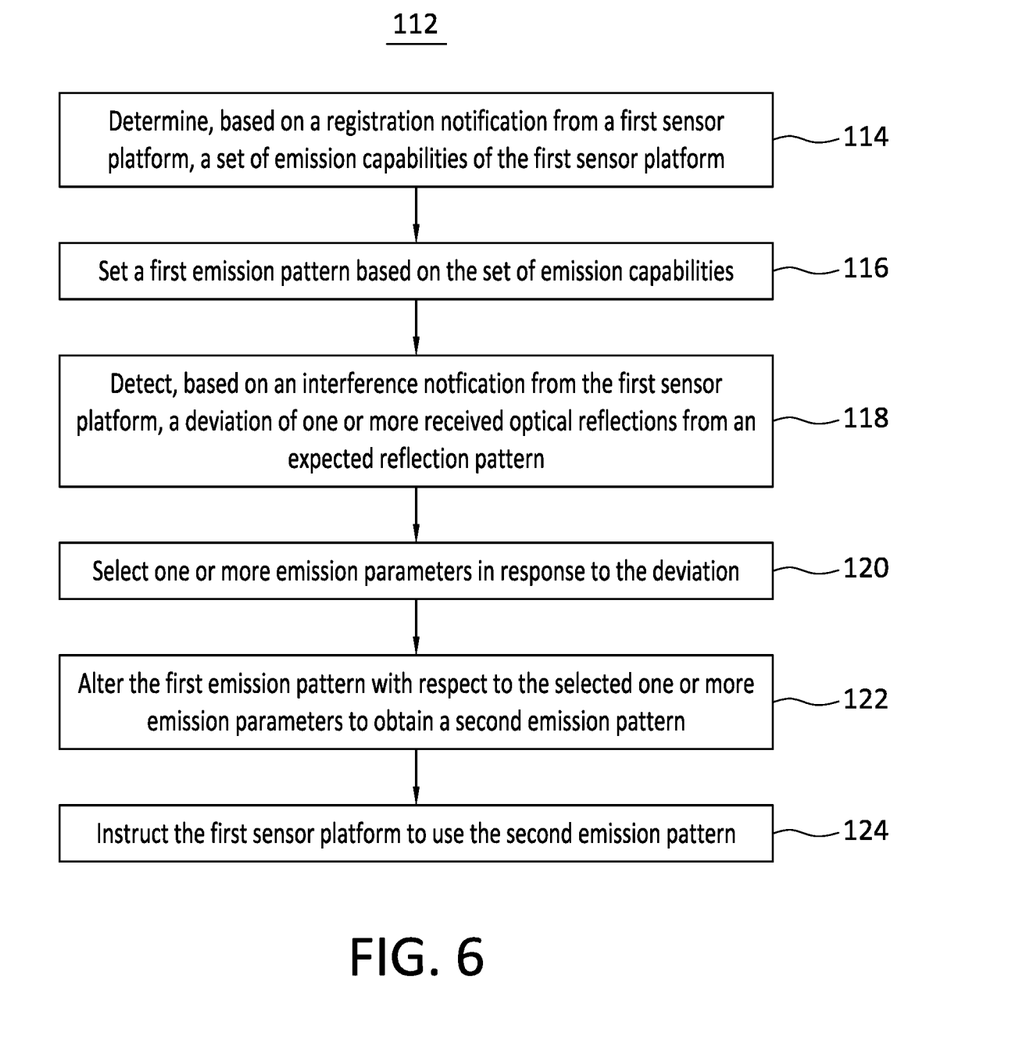
FIG. 6 is a flowchart of an example of a method of operating an infrastructure node according to an embodiment.

FIG. 6 shows a centralized method 112 of operating an infrastructure node. The method 112 may generally be implemented in an infrastructure node such as, for example, the infrastructure node 20 (FIG. 1), already discussed. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 114 determines, based on a registration notification from a first sensor platform, a set of emission capabilities of the first sensor platform. A first emission pattern is set at block 116 based on the set of emission capabilities. In an embodiment, block 116 includes confirming that the first emission pattern does not interfere with a set of stored emission patterns, wherein the set of stored emission patterns correspond to a plurality of sensor platforms in proximity to the first sensor platform. Illustrated block 118 detects, based on an interference notification from the first sensor platform, a deviation of one or more received optical reflections from an expected reflection pattern. One or more emission parameters may be selected at block 120 in response to the deviation. In an embodiment, the emission parameter(s) include pulse duration, optical frequency, pulse amplitude, pulse sequence, pulse source, transmission angle, nutation geometry, noise profile, etc., or any combination thereof. Block 122 alters the first emission pattern with respect to the selected emission parameter(s) to obtain a second emission pattern, wherein the first sensor platform is instructed at block 124 to use the second emission pattern. The illustrated method 112 therefore enhances performance by enabling the infrastructure node to arbitrate between nearby sensor platforms.

Figure 7:
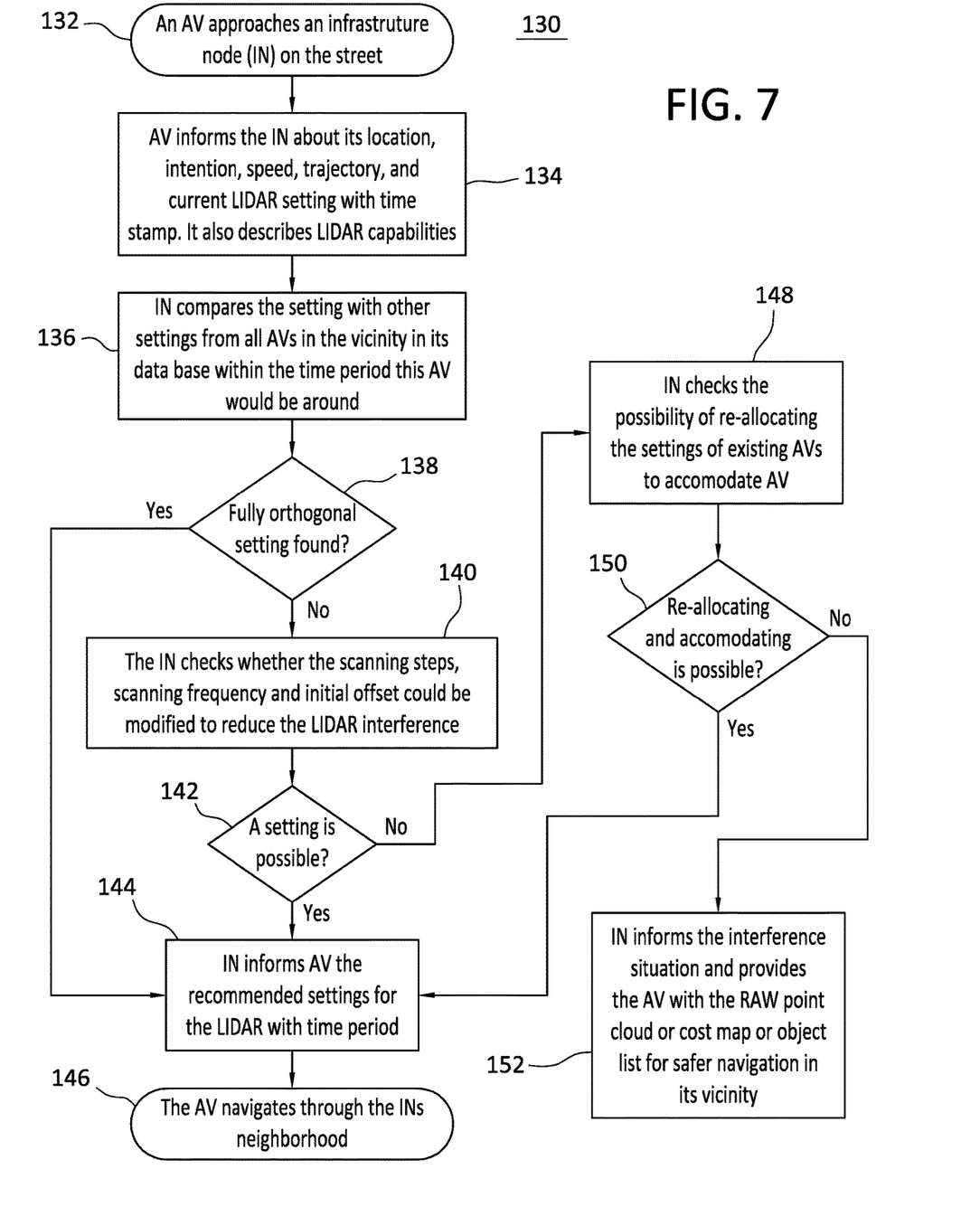
FIG. 7 is a flowchart of an example of a method of operating an infrastructure node in an AV setting according to an embodiment.

FIG. 7 shows a centralized method 130 of operating an infrastructure node in an AV setting. The method 130 may generally be implemented in an infrastructure node such as, for example, the infrastructure node 20 (FIG. 1), already discussed. More particularly, the method 130 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

An AV approaches an infrastructure node (IN) on the street at illustrated processing block 132. At block 134, the AV informs the IN about its location, intention, speed, trajectory and current lidar setting with a time stamp. Block 134 also provides for the AV describing its lidar capabilities. The IN may compare (e.g., via database search) the lidar settings at block 136 with other settings from all AVs in the vicinity, using a time period during which the AV is expected to be present. A determination is made at illustrated block 138 as to whether a fully orthogonal setting has been found. If not, block 140 checks whether the scanning steps, scanning frequency and initial offset can be modified to reduce the lidar interference. If block 142 determines that such a setting is possible, the AV may be informed at block 144 of the recommended settings and corresponding time period. The AV may then navigate through the surrounding area (e.g., neighborhood) at block 146. If a fully orthogonal setting is found at block 138, the illustrated method 130 bypasses blocks 140 and 142, and proceeds directly to block 144.

If it is determined at block 142 that the scanning steps, scanning frequency and initial offset, or other parameters, cannot be modified to reduce the lidar interference, block 148 checks the possibility of re-allocating the settings of existing AVs to accommodate this AV. Illustrated block 150 determines whether re-allocating and accommodating is possible. If so, the method 130 proceeds to block 144. Otherwise, block 152 informs the AV of the interference situation and provides the AV with a raw point cloud, cost map or object list for safer navigation in the vicinity. A cost map is a 2D (two-dimensional) representation in the format of an occupancy grid of the space surrounding an autonomous vehicle (or robot). The general term is occupancy grid, where "Costmap" is a popular implementation that assigns each cell in the grid a unique cost value used by the path planner to decide which trajectory it will follow.

Thus, a central authority (e.g., lidar coordinating server) is responsible for deciding how lidar systems can coexist, in the illustrated example. When the autonomous cars come to a region, they communicate their lidar transmit (TX) parameters to the IN. In one example embodiment, each vehicle also indicates its lidar capabilities (e.g., parameters that it can change) to the IN node. The lidar coordinating server then searches its database and determines what parameters other lidar systems are using to determine if there is a possibility of interference. If there is a possibility of interference, then the IN attempts to change the parameters of other AVs or the AV that just entered the neighborhood. Additionally, if there is interference between lidar systems then the AV requests new transmission parameters from the central authority. When the AV moves out of the neighborhood, it then transitions to a new IN or migrates to an ad hoc scheme if there is no infrastructure node (IN) present.

Figure 8:
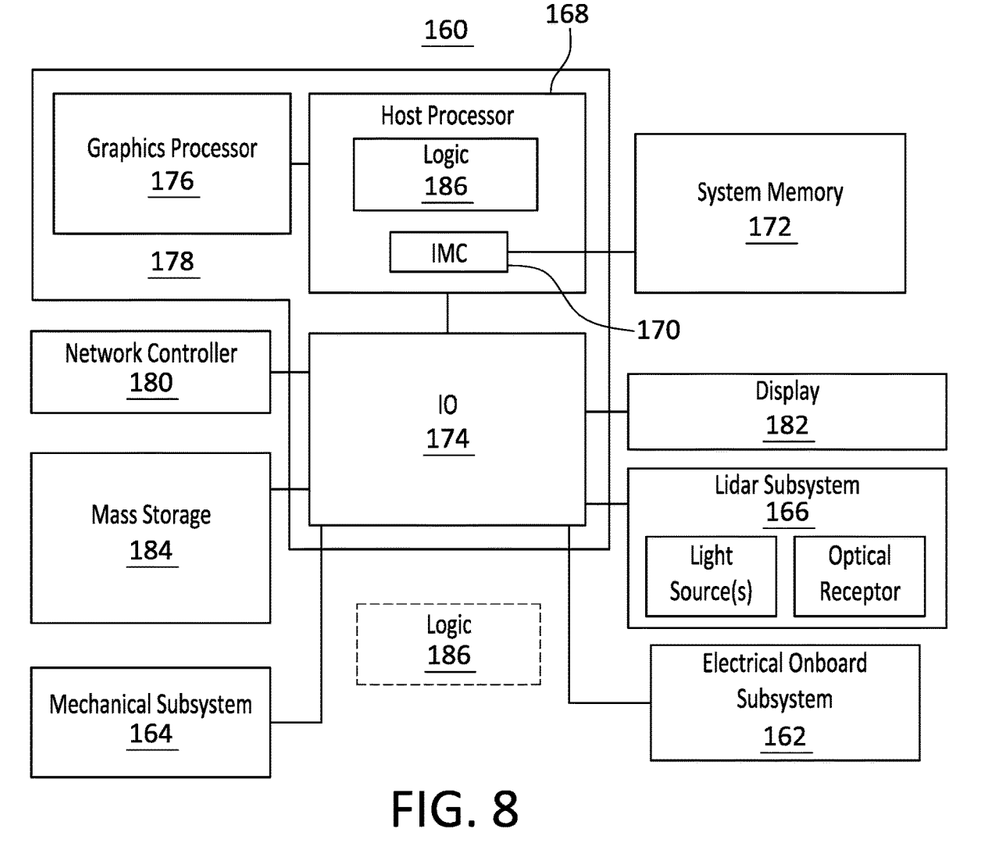
FIG. 8 is a block diagram of an example of a performance-enhanced computing system according to an embodiment.

Turning now to FIG. 8, a performance-enhanced computing system 160 is shown. The computing system 160 may be a vehicle (e.g., autonomous car, airplane, spacecraft), drone, robot, and so forth. The computing system 160 may therefore readily be substituted for the first sensor platform 14 (FIG. 1), already discussed. In another embodiment, the computing system 160 is a server that is readily substituted for an infrastructure node (e.g., central authority) such as, for example, the infrastructure node 20 (FIG. 1), already discussed. In the illustrated example, the system 160 includes an electrical onboard subsystem 162 (e.g., instrument panels, embedded controllers), a lidar subsystem 166, a mechanical subsystem 164 (e.g., drivetrain, internal combustion engines, fuel injectors, pumps, etc.) and a host processor 168 (e.g., central processing unit/CPU with one or more processor cores) having an integrated memory controller (IMC) 170 that is coupled to a system memory 172.

The illustrated system 160 also includes an input output (IO) module 174 implemented together with the host processor 168 and a graphics processor 176 on a semiconductor die 178 as a system on chip (SoC). The IO module 174 communicates with, for example, a network controller 180 (e.g., wireless, wired), a display 182, the lidar subsystem 166, the electrical onboard subsystem 162, the mechanical subsystem 164, and mass storage 184 (e.g., hard disk drive/HDD, optical disk, solid state drive/SSD, flash memory). The host processor 168 may include logic 186 (e.g., logic instructions, configurable logic, fixed-functionality hardware logic, etc., or any combination thereof) to perform one or more aspects of the method 34 (FIG. 2A), the method 48 (FIG. 2B), the method 80 (FIG. 4), the method 100 (FIG. 5), the method 112 (FIG. 6) and/or the method 130 (FIG. 7), already discussed.

Thus, if the computing system 160 is a sensor platform, the illustrated logic 186 initiates one or more optical pulses in accordance with a first emission pattern and obtains a second emission pattern in response to one or more of a time-variable trigger or a deviation of one or more received optical reflections from an expected reflection pattern. The logic 186 may also initiate one or more optical pulses in accordance with the second emission pattern.

If the computing system 160 is an infrastructure node, the logic 186 may detect, based on an interference notification from a first sensor platform, a deviation of one or more received optical reflections from an expected reflection pattern and select one or more emission parameters in response to the deviation. In such a case, the logic 186 also alters a first emission pattern with respect to the selected emission parameter(s) to obtain a second emission pattern. Although the logic 186 is shown in the host processor 168, the logic 186 may be located elsewhere in the computing system 160.

Figure 9:
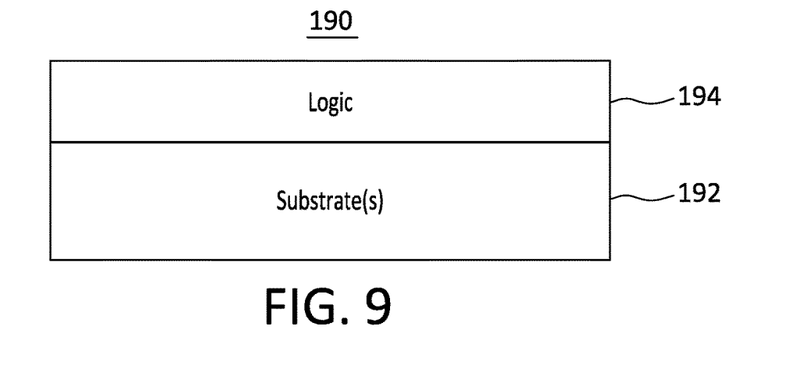
FIG. 9 is an illustration of an example of a semiconductor package apparatus according to an embodiment.

FIG. 9 shows a semiconductor package apparatus 190. The apparatus 190 may include logic 194 to implement one or more aspects of the method 34 (FIG. 2A), the method 48 (FIG. 2B), the method 80 (FIG. 4), the method 100 (FIG. 5), the method 112 (FIG. 6) and/or the method 130 (FIG. 7), already discussed, and may be readily substituted for the logic 186 (FIG. 8), already discussed. The illustrated apparatus 190 includes one or more substrates 192 (e.g., silicon, sapphire, gallium arsenide), wherein the logic 194 (e.g., transistor array and other integrated circuit/IC components) is coupled to the substrate(s) 192. The logic 194 may be implemented at least partly in configurable logic or fixed-functionality logic hardware. In one example, the logic 194 includes transistor channel regions that are positioned (e.g., embedded) within the substrate(s) 192. Thus, the interface between the logic 194 and the substrate(s) 192 may not be an abrupt junction. The logic 194 may also be considered to include an epitaxial layer that is grown on an initial wafer of the substrate(s) 192.

ADDITIONAL NOTES AND EXAMPLES

Example 1 includes a performance-enhanced computing system comprising one or more light sources to emit one or more optical pulses in accordance with a first emission pattern, an optical receptor to receive one or more optical reflections, and a processor including logic coupled to one or more substrates, wherein the logic coupled to one or more substrates is to initiate the one or more optical pulses in accordance with the first emission pattern, obtain a second emission pattern in response to one or more of a time-variable trigger or a deviation of the one or more optical reflections from an expected reflection pattern, and initiate one or more optical pulses in accordance with the second emission pattern.

Example 2 includes the computing system of Example 1, wherein the logic coupled to the one or more substrates is to identify one or more received optical reflections that do not deviate from the expected reflection pattern, and detect one or more physical objects based on the one or more received optical reflections that do not deviate from the expected reflection pattern.

Example 3 includes the computing system of Example 1, wherein the logic coupled to the one or more substrates is to select one or more emission parameters, and alter the first emission pattern with respect to the selected one or more emission parameters to obtain the second emission pattern.

Example 4 includes the computing system of Example 3, wherein the one or more emission parameters are selected from the group consisting of pulse duration, optical frequency, pulse amplitude, pulse sequence, pulse source, transmission angle, nutation geometry and noise profile.

Example 5 includes the computing system of Example 1, wherein the logic coupled to the one or more substrates is to send a notification of the deviation to an infrastructure node, and receive the second emission pattern from the infrastructure node.

Example 6 includes the computing system of Example 5, wherein the logic coupled to the one or more substrates is to send one or more of the first emission pattern or a set of emission capabilities to the infrastructure node.

Example 7 includes a semiconductor package comprising one or more substrates, and logic coupled to the one or more substrates, wherein the logic is implemented at least partly in one or more of configurable logic or fixed-functionality hardware logic, the logic coupled to the one or more substrates to initiate one or more optical pulses in accordance with a first emission pattern, obtain a second emission pattern in response to one or more of a time-variable trigger or a deviation of one or more received optical reflections from an expected reflection pattern, and initiate one or more optical pulses in accordance with the second emission pattern.

Example 8 includes the semiconductor apparatus of Example 7, wherein the logic coupled to the one or more substrates is to identify one or more received optical reflections that do not deviate from the expected reflection pattern, and detect one or more physical objects based on the one or more received optical reflections that do not deviate from the expected reflection pattern.

Example 9 includes the semiconductor apparatus of Example 7, wherein the logic coupled to the one or more substrates is to select one or more emission parameters, and alter the first emission pattern with respect to the selected one or more emission parameters to obtain the second emission pattern.

Example 10 includes the semiconductor apparatus of Example 9, wherein the one or more emission parameters are selected from the group consisting of pulse duration, optical frequency, pulse amplitude, pulse sequence, pulse source, transmission angle, nutation geometry and noise profile.

Example 11 includes the semiconductor apparatus of Example 7, wherein the logic coupled to the one or more substrates is to send a notification of the deviation to an infrastructure node, and receive the second emission pattern from the infrastructure node.

Example 12 includes the semiconductor apparatus of Example 11, wherein the logic coupled to the one or more substrates is to send one or more of the first emission pattern or a set of emission capabilities to the infrastructure node.

Example 13 includes at least one computer readable storage medium comprising a set of instructions, which when executed by a computing system, cause the computing system to initiate one or more optical pulses in accordance with a first emission pattern, obtain a second emission pattern in response to one or more of a time-variable trigger or a deviation of one or more received optical reflections from an expected reflection pattern, and initiate one or more optical pulses in accordance with the second emission pattern.

Example 14 includes the at least one computer readable storage medium of Example 13, wherein the instructions, when executed, further cause the computing system to identify one or more received optical reflections that do not deviate from the expected reflection pattern, and detect one or more physical objects based on the one or more received optical reflections that do not deviate from the expected reflection pattern.

Example 15 includes the at least one computer readable storage medium of Example 13, wherein the instructions, when executed, cause the computing system to select one or more emission parameters, and alter the first emission pattern with respect to the selected one or more emission parameters to obtain the second emission pattern.

Example 16 includes the at least one computer readable storage medium of Example 15, wherein the one or more emission parameters are selected from the group consisting of pulse duration, optical frequency, pulse amplitude, pulse sequence, pulse source, transmission angle, nutation geometry and noise profile.

Example 17 includes the at least one computer readable storage medium of Example 13, wherein the instructions, when executed, cause the computing system to send a notification of the deviation to an infrastructure node, and receive the second emission pattern from the infrastructure node.

Example 18 includes the at least one computer readable storage medium of Example 17, wherein the instructions, when executed, further cause the computing system to send one or more of the first emission pattern or a set of emission capabilities to the infrastructure node.

Example 19 includes at least one computer readable storage medium comprising a set of instructions, which when executed by an infrastructure node, cause the infrastructure node to detect, based on an interference notification from a first sensor platform, a deviation of one or more received optical reflections from an expected reflection pattern, select one or more emission parameters in response to the deviation, and alter a first emission pattern with respect to the selected one or more emission parameters to obtain a second emission pattern.

Example 20 includes the at least one computer readable storage medium of Example 19, wherein the instructions, when executed, cause the infrastructure node to confirm that the second emission pattern does not interfere with a set of stored emission patterns, and wherein the set of stored emission patterns correspond to a plurality of sensor platforms in proximity to the first sensor platform.

Example 21 includes the at least one computer readable storage medium of Example 19, wherein the instructions, when executed, cause the infrastructure node to instruct the first sensor platform to use the second emission pattern.

Example 22 includes the at least one computer readable storage medium of Example 19, wherein the instructions, when executed, cause the infrastructure node to determine, based on a registration notification from the first sensor platform, a set of emission capabilities of the first sensor platform, and set the first emission pattern based on the set of emission capabilities.

Example 23 includes the at least one computer readable storage medium of Example 22, wherein the instructions, when executed, cause the infrastructure node to confirm that the first emission pattern does not interfere with a set of stored emission patterns, and wherein the set of stored emission patterns correspond to a plurality of sensor platforms in proximity to the first sensor platform.

Example 24 includes the at least one computer readable storage medium of Example 19, wherein the one or more emission parameters are selected from the group consisting of pulse duration, optical frequency, pulse amplitude, pulse sequence, pulse source, transmission angle, nutation geometry and noise profile.

Example 25 includes a method of operating a computing system, comprising initiating one or more optical pulses in accordance with a first emission pattern, obtaining a second emission pattern in response to one or more of a time-variable trigger or a deviation of one or more received optical reflections from an expected reflection pattern, and initiating one or more optical pulses in accordance with the second emission pattern.

Example 26 includes a method of operating an infrastructure node, comprising detecting, based on an interference notification from a first sensor platform, a deviation of one or more received optical reflections from an expected reflection pattern, selecting one or more emission parameters in response to the deviation, and altering a first emission pattern with respect to the selected one or more emission parameters to obtain a second emission pattern.

Example 27 includes means for performing the methods of any one of Examples 25 or 26.

Thus, technology described herein may eliminate any requirement for a lidar system to be used in isolation. For example, the technology solves the problem encountered when a lidar system is unable to distinguish a received light pulse as its own (e.g., false return pulses may otherwise perturb subsequent calculations of speed, depth, occlusion, etc. derived from the round-trip characteristics of the beam). In order to have multiple lidar systems coexist, multiple vectors of differentiation are introduced in the emission characteristics of a lidar's pulse. The vectors of differentiation significantly reduce the probability of signal overlap or confusion (e.g., pulse length, emission pattern, modulation of pulse wave forms and encoding, and single- or multi-beam emissions). By increasing the information encoded in pulses, the "signature" of a pulse is greatly increased. Moreover, multiple lidar units may be leveraged in tandem to further increase the degrees of differentiation. For example, having multiple measurements made in sequence of the same surroundings (e.g., two units with a rotational offset, and merging their data) or the use of orthogonal modulation methods can significantly enhance performance.

Thus, for a reflected pulse to be accepted, the received emission pattern would need to "match" the transmitted pattern. Multiple emission patterns may be generated through, for example, a nutating mirror that rotates about its axis. One example is an elliptical pattern that is generated through a nutating mirror. The plane of mirror is at an inclination to the rotation axis, which causes the points to be fired in an elliptical pattern.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   one or more light sources to emit one or more first optical pulses in accordance with a first emission pattern, and one or more second optical pulses in accordance with the first emission pattern;
   an optical receptor to receive one or more optical reflections; and
   a processor including logic coupled to one or more substrates, wherein the logic coupled to the one or more substrates is to:
   initiate the one or more first optical pulses in accordance with the first emission pattern,
   detect whether a time-variable trigger is present,
   in response to the time-variable trigger not being present, initiate the one or more second optical pulses in accordance with the first emission pattern,
   in response to the time-variable trigger being present, obtain a second emission pattern, and
   initiate one or more third optical pulses in accordance with the second emission pattern.

2. The computing system of claim 1, wherein the logic coupled to the one or more substrates is to:
   identify one or more received optical reflections that do not deviate from an expected reflection pattern, and
   detect one or more physical objects based on the one or more received optical reflections that do not deviate from the expected reflection pattern.

3. The computing system of claim 1, wherein the logic coupled to the one or more substrates is to:
   select one or more emission parameters, and
   alter the first emission pattern with respect to the selected one or more emission parameters to obtain the second emission pattern.

4. The computing system of claim 3, wherein:
   the one or more emission parameters are selected from the group consisting of pulse duration, optical frequency, pulse amplitude, pulse sequence, pulse source, transmission angle, nutation geometry and noise profile; and
   the logic coupled to the one or more substrates is to generate the time-variable trigger with a random number generator, a pseudorandom number generator, or a non-deterministic output generator.

5. The computing system of claim 1, wherein the logic coupled to the one or more substrates is to:
   send a notification of a deviation of one or more received optical reflections from an expected reflection pattern to an infrastructure node, and
   receive the second emission pattern from the infrastructure node.

6. The computing system of claim 5, wherein the logic coupled to the one or more substrates is to send one or more of the first emission pattern or a set of emission capabilities to the infrastructure node.

7. A semiconductor package comprising:
   one or more substrates; and
   logic coupled to the one or more substrates, wherein the logic is implemented at least partly in one or more of configurable logic or fixed-functionality hardware logic, the logic coupled to the one or more substrates to:
   initiate one or more first optical pulses in accordance with a first emission pattern,
   detect whether a time-variable trigger is present,
   in response to the time-variable trigger not being present, initiate one or more second optical pulses in accordance with the first emission pattern,
   in response to the time-variable trigger being present, obtain a second emission pattern, and
   initiate one or more third optical pulses in accordance with the second emission pattern.

8. The semiconductor package of claim 7, wherein the logic coupled to the one or more substrates is to:
   identify one or more received optical reflections that do not deviate from an expected reflection pattern, and
   detect one or more physical objects based on the one or more received optical reflections that do not deviate from the expected reflection pattern.

9. The semiconductor package of claim 7, wherein the logic coupled to the one or more substrates is to:
   select one or more emission parameters, and
   alter the first emission pattern with respect to the selected one or more emission parameters to obtain the second emission pattern.

10. The semiconductor package of claim 9, wherein:
    the one or more emission parameters are selected from the group consisting of pulse duration, optical frequency, pulse amplitude, pulse sequence, pulse source, transmission angle, nutation geometry and noise profile; and
    the logic coupled to the one or more substrates is to generate the time-variable trigger with a random number generator, a pseudorandom number generator, or a non-deterministic output generator.

11. The semiconductor package of claim 7, wherein the logic coupled to the one or more substrates is to:
    send a notification of a deviation of one or more received optical reflections from an expected reflection pattern to an infrastructure node, and
    receive the second emission pattern from the infrastructure node.

12. The semiconductor package of claim 11, wherein the logic coupled to the one or more substrates is to send one or more of the first emission pattern or a set of emission capabilities to the infrastructure node.

13. At least one non-transitory computer readable storage medium comprising a set of instructions, which when executed by a computing system, cause the computing system to:
    initiate one or more optical first pulses in accordance with a first emission pattern;
    detect whether a time-variable trigger is present;
    in response to the time-variable trigger not being present, initiate one or more second optical pulses in accordance with the first emission pattern;
    in response to the time-variable trigger being present, obtain a second emission pattern; and
    initiate one or more third optical pulses in accordance with the second emission pattern.

14. The at least one non-transitory computer readable storage medium of claim 13, wherein the instructions, when executed, further cause the computing system to:
  identify one or more received optical reflections that do not deviate from an expected reflection pattern; and
  detect one or more physical objects based on the one or more received optical reflections that do not deviate from the expected reflection pattern.

15. The at least one non-transitory computer readable storage medium of claim 13, wherein the instructions, when executed, cause the computing system to:
  select one or more emission parameters; and
  alter the first emission pattern with respect to the selected one or more emission parameters to obtain the second emission pattern.

16. The at least one non-transitory computer readable storage medium of claim 15, wherein:
  the one or more emission parameters are selected from the group consisting of pulse duration, optical frequency, pulse amplitude, pulse sequence, pulse source, transmission angle, nutation geometry and noise profile; and
  wherein the instructions, when executed, cause the computing system to generate the time-variable trigger with a random number generator, a pseudorandom number generator, or a non-deterministic output generator.

17. The at least one non-transitory computer readable storage medium of claim 13, wherein the instructions, when executed, cause the computing system to:
  send a notification of a deviation of one or more received optical reflections from an expected reflection pattern to an infrastructure node; and
  receive the second emission pattern from the infrastructure node.

18. The at least one non-transitory computer readable storage medium of claim 17, wherein the instructions, when executed, further cause the computing system to send one or more of the first emission pattern or a set of emission capabilities to the infrastructure node.

19. At least one non-transitory computer readable storage medium comprising a set of instructions, which when executed by an infrastructure node, cause the infrastructure node to:
  detect whether a time-variable trigger associated with a first sensor platform is present;
  in response to the time-variable trigger not being present, bypass a modification to a first emission pattern associated with the first sensor platform;
  in response to the time-variable trigger being present, select one or more emission parameters; and
  in response to the time-variable trigger being present, alter the first emission pattern with respect to the selected one or more emission parameters to obtain a second emission pattern.

20. The at least one non-transitory computer readable storage medium of claim 19, wherein the instructions, when executed, cause the infrastructure node to confirm that the second emission pattern does not interfere with a set of stored emission patterns, and wherein the set of stored emission patterns correspond to a plurality of sensor platforms in proximity to the first sensor platform.

21. The at least one non-transitory computer readable storage medium of claim 19, wherein the instructions, when executed, cause the infrastructure node to instruct the first sensor platform to use the second emission pattern.

22. The at least one non-transitory computer readable storage medium of claim 19, wherein the instructions, when executed, cause the infrastructure node to:
  determine, based on a registration notification from the first sensor platform, a set of emission capabilities of the first sensor platform; and
  set the first emission pattern based on the set of emission capabilities.

23. The at least one non-transitory computer readable storage medium of claim 22, wherein the instructions, when executed, cause the infrastructure node to confirm that the first emission pattern does not interfere with a set of stored emission patterns, and wherein the set of stored emission patterns correspond to a plurality of sensor platforms in proximity to the first sensor platform.

24. The at least non-transitory one computer readable storage medium of claim 19, wherein:
  the one or more emission parameters are selected from the group consisting of pulse duration, optical frequency, pulse amplitude, pulse sequence, pulse source, transmission angle, nutation geometry and noise profile; and
  wherein the instructions, when executed, cause the infrastructure node to generate the time-variable trigger with a random number generator, a pseudorandom number generator, or a non-deterministic output generator.

* * * * *